US008908580B2

(12) United States Patent
Shen

(10) Patent No.: US 8,908,580 B2
(45) Date of Patent: Dec. 9, 2014

(54) METHOD AND APPARATUS FOR AUTOMATIC SWITCHING BETWEEN NETWORKS, WIRELESS ACCESS DEVICE, AND INTERMEDIATE DEVICE

(71) Applicant: Huawei Device Co., Ltd., Shenzhen, Guangdong (CN)

(72) Inventor: Lingguang Shen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 115 days.

(21) Appl. No.: 13/731,792

(22) Filed: Dec. 31, 2012

(65) Prior Publication Data

US 2013/0121311 A1 May 16, 2013

Related U.S. Application Data

(63) Continuation of application No. PCT/CN2011/083433, filed on Dec. 5, 2011.

(30) Foreign Application Priority Data

Dec. 17, 2010 (CN) .......................... 2010 1 0593853

(51) Int. Cl.
*H04B 7/00* (2006.01)
*H04W 36/14* (2009.01)
*H04W 76/04* (2009.01)
*H04W 36/38* (2009.01)

(52) U.S. Cl.
CPC ............ *H04W 36/14* (2013.01); *H04W 76/041* (2013.01); *H04W 36/38* (2013.01)
USPC ........................................................ 370/310

(58) Field of Classification Search
CPC ..................................................... H04W 36/14
USPC .......................... 370/310, 328, 329, 331, 332
See application file for complete search history.

(56) References Cited

U.S. PATENT DOCUMENTS 6,243,581 B1   6/2001 Jawanda
6,343,220 B1 * 1/2002 Van Der Salm ............ 455/552.1

(Continued)

FOREIGN PATENT DOCUMENTS

CN   1996913 A      7/2007
CN   101227290 A    7/2008

(Continued)

OTHER PUBLICATIONS

Foreign Communication From a Counterpart Application, European Application No. 11849566.2, Extended European Search Report dated Sep. 6, 2013, 6 pages.

(Continued)

*Primary Examiner* — Dmitry H Levitan
(74) *Attorney, Agent, or Firm* — Conley Rose, P.C.; Grant Rodolph; Nicholas K. Beaulieu

(57) ABSTRACT

Embodiments of the present invention disclose a method and an apparatus for automatic switching between networks, a wireless access device, and an intermediate device. The method includes: receiving, by the wireless access device, after a connection between the wireless access device and the intermediate device is established, an instruction message sent by the intermediate device, where the instruction message instructs the wireless access device to switch from a currently connected wireless network to a wired network; connecting, by the wireless access device, according to the instruction message, the wired network through the intermediate device, and breaking the connection with the wireless network; and switching, by the wireless access device, from the wired network to the wireless network when a connection between the wireless access device and the wired network is broken. The present invention is applicable to the automatic switching between the wireless network and the wired network.

19 Claims, 6 Drawing Sheets

(56) References Cited

U.S. PATENT DOCUMENTS

| | | | |
|---|---|---|---|
| 6,711,146 B2* | 3/2004 | Yegoshin | 370/338 |
| 8,583,172 B2* | 11/2013 | Essigmann | 455/552.1 |
| 2002/0114317 A1* | 8/2002 | Dorenbosch et al. | 370/352 |
| 2002/0198977 A1 | 12/2002 | Cho | |
| 2004/0192211 A1 | 9/2004 | Gallagher et al. | |
| 2005/0068938 A1* | 3/2005 | Wang et al. | 370/352 |
| 2006/0046750 A1* | 3/2006 | Deschenes | 455/462 |
| 2008/0070619 A1* | 3/2008 | Yu | 455/552.1 |
| 2008/0285555 A1 | 11/2008 | Ogasahara | |
| 2009/0003831 A1 | 1/2009 | Zheng | |
| 2009/0207812 A1 | 8/2009 | Gupta et al. | |
| 2009/0262682 A1 | 10/2009 | Khetawat et al. | |
| 2009/0279506 A1 | 11/2009 | Sinnreich et al. | |
| 2011/0090818 A1* | 4/2011 | Alexis | 370/254 |
| 2011/0299538 A1 | 12/2011 | Maruta | |

FOREIGN PATENT DOCUMENTS

| | | |
|---|---|---|
| CN | 101873723 A | 10/2010 |
| CN | 102143536 A | 8/2011 |
| JP | 2003018642 A | 1/2003 |
| JP | 2003339083 A | 11/2003 |
| JP | 2008510394 A | 4/2008 |
| JP | 2008288880 A | 11/2008 |
| JP | 2009147428 A | 7/2009 |
| JP | 2010074782 A | 4/2010 |
| JP | 2010199738 A | 9/2010 |

OTHER PUBLICATIONS

Communication from a foreign counterpart application, International Application No. PCT/CN2011/083433, International Search Report dated Mar. 8, 2012, 4 pages.

Communication from a foreign counterpart application, International Application No. PCT/CN2011/083433, Partial English Translation, International Search Report dated Mar. 8, 2012, 3 pages.

Foreign Communications From a Counterpart Application, Chinese Application 201010593853.2, Chinese Office Action dated Jan. 14, 2013, 6 pages.

Foreign Communications From a Counterpart Application, Chinese Application 201010593853.2, Partial English Translation of Chinese Office Action dated Jan. 14, 2013, 3 pages.

Foreign Communication From a Counterpart Application, Japanese Application No. 2013-520963, Japanese Office Action dated Jan. 15, 2014, 3 pages.

Foreign Communication From a Counterpart Application, Japanese Application No. 2013-520963, English Translation of Japanese Office Action dated Jan. 15, 2014, 4 pages.

* cited by examiner

METHOD AND APPARATUS FOR AUTOMATIC SWITCHING BETWEEN NETWORKS, WIRELESS ACCESS DEVICE, AND INTERMEDIATE DEVICE

CROSS-REFERENCE TO RELATED APPLICATIONS

This application is a continuation of International Application No. PCT/CN2011/083433, filed on Dec. 5, 2011, which claims priority to Chinese Patent Application No. 201010593853.2, filed on Dec. 17, 2010, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communication technologies, and in particular, to a method and an apparatus for automatic switching between networks, a wireless access device, and an intermediate device.

BACKGROUND

With the popularity of the 3rd-generation mobile communication technology (3G) network, the rate of uploading and downloading data through a wireless network is increasingly high, and the bearer of the wireless network is limited, and therefore, the wireless local area networks (WLAN) technology is widely adopted as a cell hotspot. On one hand, the tariff of a user can be reduced, and on the other hand, the network loads can be reduced to a great extent, thereby providing the user with more efficient network services.

At present, the user may access a network through the wireless network or a wired network. When the user accesses the 3G network through the wireless network, the wide area network (WAN) port dialing function can be directly mounted onto a wireless protocol stack of a baseband chip, and a WLAN user is mounted as a local area network (LAN) interface to an Internet Protocol (IP) layer through a network bridge, so as to achieve that multiple persons can simultaneously share a bandwidth that is applied for by an account. The solution, to a certain extent, alleviates the defect that only a limited number of users can access a cell of the 3G network, but being limited by the mobile network, a mobile device has defects of an unstable bandwidth, relatively high tariff, and limited standby time.

When the user accesses the network through the wired network, the network bridge is mounted to the IP layer through the LAN interface, and the other side of the WAN interface interconnected with the IP layer is connected to the wired network, thereby enabling the LAN user to access the network through the wired network. The solution can only enable the user to fixedly access the network at a certain place, and the user cannot experience the convenience of mobile network access.

During an implementation process of the present invention, the inventor finds that the prior art has at least the following problems:

In the prior art, a same user can only choose to access the network through either the wired network or the wireless network, and therefore, it is difficult for the user to not only enjoy the convenience brought by the wireless network but also enjoy the stable bandwidth of the wired network.

SUMMARY

Embodiments of the present invention provide a method and an apparatus for automatic switching between networks, a wireless access device, and an intermediate device, where automatic switching between a wireless network and a wired network can be performed, and a user can be enabled to not only enjoy the convenience brought by the wireless network but also enjoy a stable bandwidth of the wired network.

The technical solutions adopted in the embodiments of the present invention are:

A method for automatic switching between networks, where the method includes: receiving, by a wireless access device, after a connection between the wireless access device and an intermediate device is established, an instruction message sent by the intermediate device, where the instruction message instructs the wireless access device to switch from a currently connected wireless network to a wired network; connecting, by the wireless access device, according to the instruction message, the wired network through the intermediate device, and breaking the connection with the wireless network; and switching, by the wireless access device, from the wired network to the wireless network when a connection between the wireless access device and the wired network is broken.

A wireless access device, which includes: a receiving module configured to receive, after a connection between the wireless access device and an intermediate device is established, an instruction message sent by the intermediate device, where the instruction message instructs the wireless access device to switch from a currently connected wireless network to a wired network; a first switching module configured to connect, according to the instruction message, the wired network through the intermediate device, and break the connection with the wireless network; and a second switching module configured to switch from the wired network to the wireless network when a connection between the wireless access device and the wired network is interrupted.

An intermediate device, which includes: a first interface module, where the intermediate device establishes a connection with a wireless access device through the first interface module; an instruction message sending module configured to send, after the connection between the intermediate device and the wireless access device is established, an instruction message to the wireless access device through the first interface module, and instruct the wireless access device to switch from a currently connected wireless network to a wired network; and a second interface module, where the intermediate device establishes a connection with a home gateway through the second interface module, and the home gateway is connected to the wired network.

An intermediate device, which includes: a first interface module, where the intermediate device establishes a connection with a wireless access device through the first interface module; an instruction message sending module configured to send, after the connection between the intermediate device and the wireless access device is established, an instruction message to the wireless access device through the first interface module, and instruct the wireless access device to switch from a currently connected wireless network to a wired network; and a third interface module, where the intermediate device establishes a connection with the wired network through the third interface module.

An apparatus for automatic switching between networks, where the apparatus includes the foregoing wireless access device and any one of the foregoing intermediate devices.

In the method and the apparatus for automatic switching between networks, the wireless access device, and the intermediate device provided in the embodiments of the present invention, after the connection between the wireless access device and the intermediate device is established, according to the instruction of the intermediate device, the wireless access device can be connected to the wired network through the intermediate device, and the connection with the wireless network is broken, and when the connection between the wireless access device and the wired network is broken, the wireless access device switches from the wired network to the wireless network. Compared with the prior art, the wireless access device can automatically switch between the wireless network and the wired network, and the user cannot only enjoy advantages of the wireless network but also enjoy advantages of the wired network, and furthermore, the quality of user experience can be improved.

BRIEF DESCRIPTION OF THE DRAWINGS

To illustrate the technical solutions in the embodiments of the present invention more clearly, the accompanying drawings required for describing the embodiments are introduced briefly in the following. Apparently, the accompanying drawings in the following description are merely some embodiments of the present invention, and persons of ordinary skill in the art can further derive other drawings according to these accompanying drawings without making creative efforts.

DETAILED DESCRIPTION

The technical solutions in the embodiments of the present invention are clearly and completely described in the following with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without making creative efforts shall fall within the protection scope of the present invention.

In order to make the advantages of the technical solutions of the present invention clearer, the present invention is described in detail in the following with reference to the accompanying drawings and the embodiments.

Embodiment 1

Figure 1:
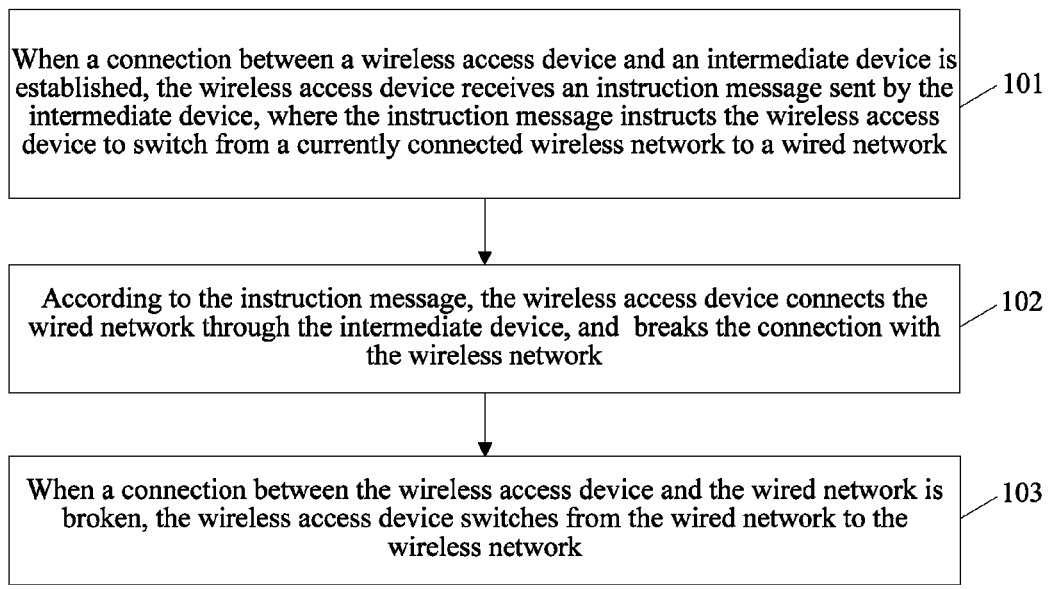
FIG. 1 is a flow chart of a method according to Embodiment 1 of the present invention.

An embodiment provides a method for automatic switching between networks, and as shown in FIG. 1, the method includes:

101: After a connection between a wireless access device and an intermediate device is established, the wireless access device receives an instruction message sent by the intermediate device, where the instruction message instructs the wireless access device to switch from a currently connected wireless network to a wired network.

102: The wireless access device connects, according to the instruction message, the wired network through the intermediate device, and breaks the connection with the wireless network.

Optionally, the intermediate device may be a network bridge device, a home gateway is further set between the wireless access device and the wired network, and the wireless access device is connected to the wired network through the intermediate device and the home gateway.

Optionally, the intermediate device may be a device integrated with functions of the home gateway, specifically may be a home gateway having a universal serial bus (USB) composite device and can communicate with the wireless access device through a USB interface.

103: When a connection between the wireless access device and the wired network is broken, the wireless access device switches from the wired network to the wireless network.

In the method for automatic switching between networks provided in the embodiment of the present invention, after the connection between the wireless access device and the intermediate device is established, the wireless access device can be connected, according to the instruction of the intermediate device, to the wired network through the intermediate device, and the connection with the wireless network is broken, and when the connection between the wireless access device and the wired network is broken, the wireless access device switches from the wired network to the wireless network. Compared with the prior art, the wireless access device can automatically switch between the wireless network and the wired network, and the user cannot only enjoy advantages of the wireless network but also enjoy advantages of the wired network, and furthermore, the quality of user experience can be improved.

Embodiment 2

This embodiment provides a method for automatic switching between networks. In this embodiment, a wireless access device is currently connected to a 3G network, and after a connection between the wireless access device and an intermediate device is established, the wireless access device is connected to a wired network through the intermediate device and a home gateway, and the connection with the 3G network broken, and when a connection between the wireless access device and the wired network is broken, the wireless access device switches from the wired network to the 3G network.

In this embodiment, the intermediate device may be a network bridge device.

Figure 2:
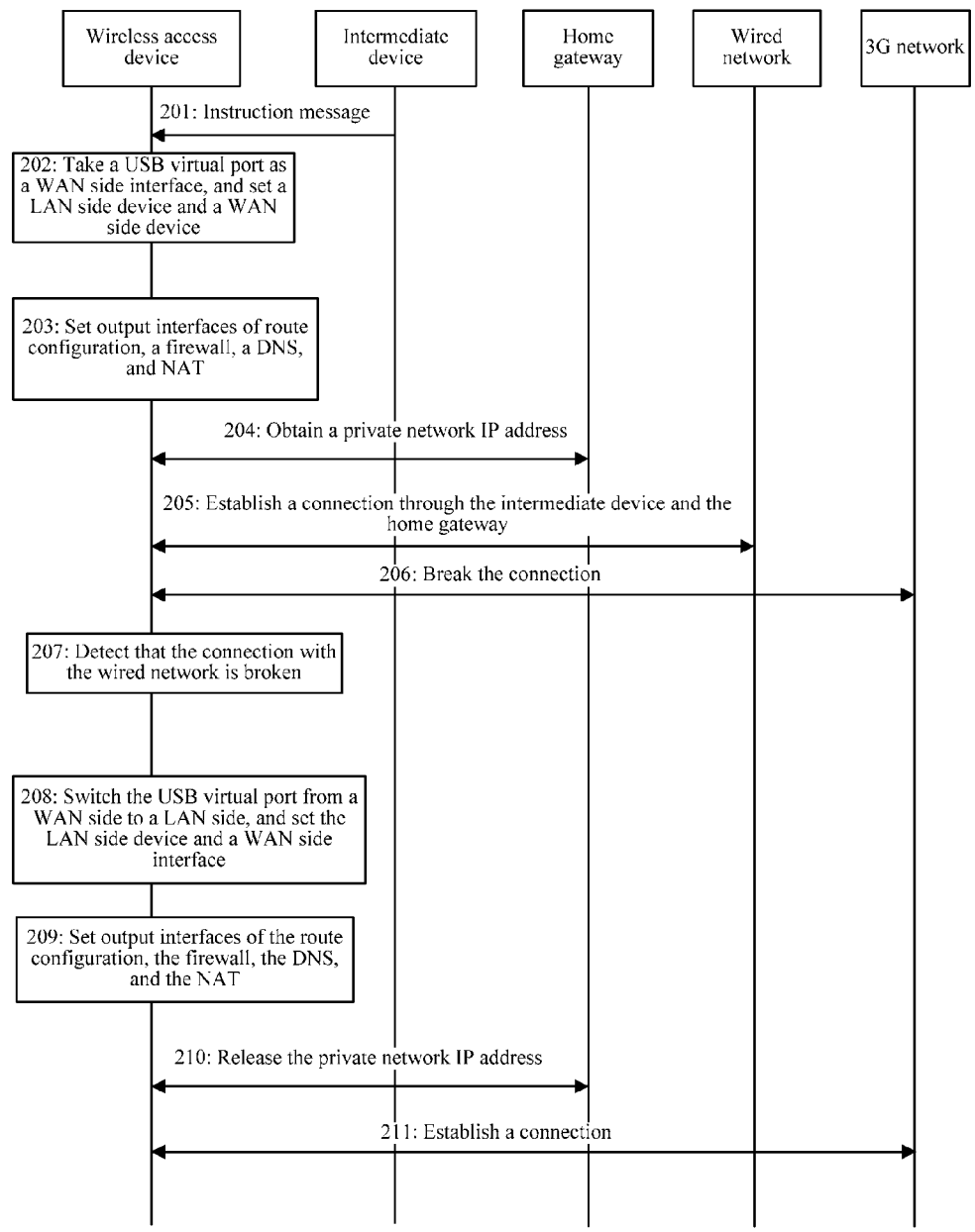
FIG. 2 is a flow chart of a method according to Embodiment 2 of the present invention.

As shown in FIG. 2, the method for automatic switching between networks includes:

201: After the connection between the wireless access device and the intermediate device is established, the wireless access device receives an instruction message sent by the intermediate device, where the instruction message instructs the wireless access device to switch from the currently connected 3G network to the wired network, and the wireless access device and the intermediate device have a corresponding USB virtual port.

The wireless access device has a dynamic host configuration protocol (DHCP) server and can allocate a private network IP address of a self-defined DHCP server IP address pool to a user equipment accessing the wireless access device.

202: The wireless access device, according to the instruction message, breaks the WAN port dialing from a 3G interface, removes the USB virtual port at a LAN side from the network bridge at the same time, mounts the USB virtual port as a WAN side interface to an IP layer, takes the user equipment accessing the wireless access device as a LAN side device of the wireless access device, and takes the intermediate device as a WAN side device of the wireless access device.

203: The wireless access device sets output interfaces of current route configuration, a firewall, a domain name server (DNS), and a network address translation (NAT) as the USB virtual port, sets a default gateway address of a routing table as an IP address of an intermediate device side, and sets a public network address of the NAT as a gateway address of the intermediate device side.

204: The wireless access device obtains a private network IP address from the home gateway.

205: The wireless access device, according to the private network IP address, through the intermediate device and the home gateway, accesses the wired network which is connected to the home gateway.

The home gateway may be an Asymmetric Digital Subscriber Line (ADSL), a router, and so on, but is not limited to this.

206: The wireless access device breaks the connection with the 3G network.

It can be seen from the foregoing that the wireless access device enters a wired network connection mode.

207: The wireless access device detects that the connection between the wireless access device and the wired network is broken.

When the wireless access device detects that its USB virtual port is not available or the intermediate device cannot be connected to the home gateway, it indicates that the connection between the wireless access device and the wired network is broken.

208: The wireless access device switches the USB virtual port from the WAN side to the LAN side, and mounts the USB virtual port under the network bridge, takes the user equipment accessing the wireless access device as the LAN side device of the wireless access device, and starts its 3G interface as a WAN side interface.

209: The wireless access device sets output interfaces of the current route configuration, the firewall, the DNS, and the NAT as the 3G interface, sets the default gateway address of the routing table as an IP address obtained from the 3G network side, and sets the public network address of the NAT as an address of the 3G network side.

210: The wireless access device sends to the home gateway a request of releasing the private network IP address, so as to make the home gateway release the private network IP address.

211: The wireless access device establishes the connection with the 3G network.

It can be seen from the foregoing that the wireless access device enters a wireless network connection mode.

In the method for automatic switching between networks provided in the embodiment of the present invention, after the connection between the wireless access device and the intermediate device is established, the wireless access device can be connected, according to the instruction of the intermediate device, to the wired network through the intermediate device and the home gateway, and the connection with the wireless network is broken, and when the connection between the wireless access device and the wired network is broken, the wireless access device switches from the wired network to the wireless network. Compared with the prior art, the wireless access device can automatically switch between the wireless network and the wired network, and the user cannot only enjoy advantages of the wireless network but also enjoy advantages of the wired network, and furthermore, the quality of user experience can be improved. In addition, the intermediate device can charge the wireless access device and can improve the standby capability of the wireless access device.

Embodiment 3

This embodiment provides a method for automatic switching between networks. In this embodiment, a wireless access device is currently connected to a 3G network, and after a connection between the wireless access device and an intermediate device is established, the wireless access device is connected to a wired network through the intermediate device, and the connection with the 3G network is broken, and when a connection between the wireless access device and the wired network is broken, the wireless access device switches from the wired network to the 3G network.

What is different from Embodiment 2 is that, in this embodiment, the intermediate device is integrated with functions of a home gateway, specifically may be a home gateway having a USB composite device, and can communicate with the wireless access device through a USB interface; or the intermediate device may also be a home gateway having a composite device such as a network port and a serial port, and can communicate with the wireless access device in a manner through the network port or the serial port.

Figure 3:
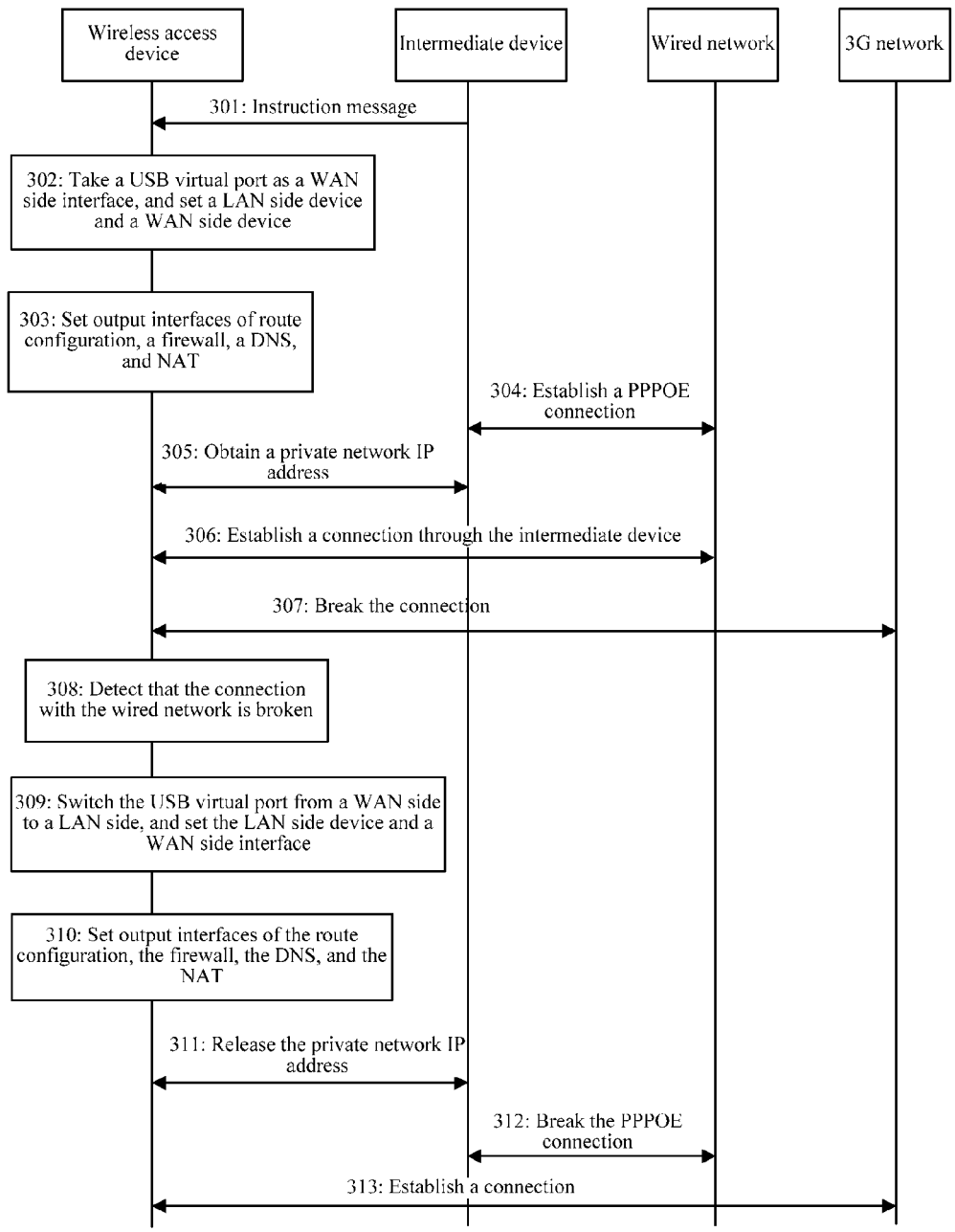
FIG. 3 is a flow chart of a method according to Embodiment 3 of the present invention.

As shown in FIG. 3, the method for automatic switching between networks includes:

301: After a connection between the wireless access device and the intermediate device is established, the wireless access device receives an instruction message sent by the intermediate device, where the instruction message instructs the wireless access device to switch from a currently connected 3G network to the wired network, and the wireless access device and the intermediate device have a corresponding USB virtual port.

The wireless access device has a DHCP server and can allocate a private network IP address of a self-defined DHCP server IP address pool to a user equipment accessing the wireless access device.

302: The wireless access device, according to the instruction message, breaks the WAN port dialing from a 3G interface, removes the USB virtual port at a LAN side from a network bridge at the same time, mounts the USB virtual port as a WAN side interface to an IP layer, takes the user equipment accessing the wireless access device as a LAN side device of the wireless access device, and takes the intermediate device as a WAN side device of the wireless access device.

303: The wireless access device sets output interfaces of current route configuration, a firewall, a DNS, and NAT as the USB virtual port, sets a default gateway address of a routing table as an IP address of an intermediate device side, and sets a public network address of the NAT as a gateway address of the intermediate device side.

304: The intermediate device initiates a Point-to-Point Protocol over Ethernet (PPPOE) dialing request to the wired network, and establishes a PPPOE dialing connection between the intermediate device and the wired network.

305: The wireless access device obtains a private network IP address from the intermediate device.

306: The wireless access device, according to the private network IP address, accesses the wired network through the intermediate device.

Step 304 may be performed anytime after step 301 and before step 306.

307: The wireless access device breaks the connection with the 3G network.

It can be seen from the foregoing that the wireless access device enters a wired network connection mode.

308: The wireless access device detects that the connection between the wireless access device and the wired network is broken.

When the wireless access device detects that its USB virtual port is not available or the intermediate device cannot work normally, it indicates that the connection between the wireless access device and the wired network is broken.

309: The wireless access device switches the USB virtual port from the WAN side to the LAN side, and mounts the USB virtual port under the network bridge, takes the user equipment accessing the wireless access device as the LAN side device of the wireless access device, and starts its 3G interface as a WAN side interface.

310: The wireless access device sets the output interfaces of the current route configuration, the firewall, the DNS, and NAT as the 3G interface, sets the default gateway address of the routing table as an IP address obtained from the 3G network side, and sets the public network address of the NAT as an address of the 3G network side.

311: The wireless access device sends to the intermediate device a request of releasing the private network IP address, so as to make the intermediate device release the private network IP address.

312: The intermediate device initiates a PPPOE breaking dialing request to the wired network and breaks the PPPOE dialing connection between the intermediate device and the wired network.

313: The wireless access device establishes the connection with the 3G network.

Step 312 may be performed anytime after step 308 and before step 313.

It can be seen from the foregoing that the wireless access device enters a wireless network connection mode.

In the method for automatic switching between networks provided in the embodiment of the present invention, after the connection between the wireless access device and the intermediate device is established, the wireless access device can be connected, according to the instruction of the intermediate device, to the wired network through the intermediate device, and the connection with the wireless network is broken, and when the connection between the wireless access device and the wired network is broken, the wireless access device switches from the wired network to the wireless network. Compared with the prior art, the wireless access device can automatically switch between the wireless network and the wired network, and the user cannot only enjoy advantages of the wireless network but also enjoy advantages of the wired network, and furthermore, the quality of user experience can be improved. In addition, the intermediate device can charge the wireless access device and can improve the standby capability of the wireless access device.

Embodiment 4

Figure 4:
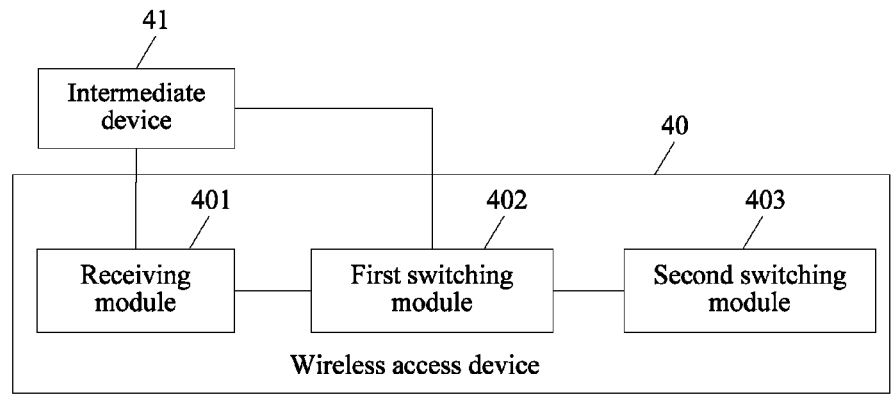
FIG. 4, FIG. 5, and FIG. 6 are schematic structural diagrams of a wireless access device according to Embodiment 4 of the present invention.
Figure 5:
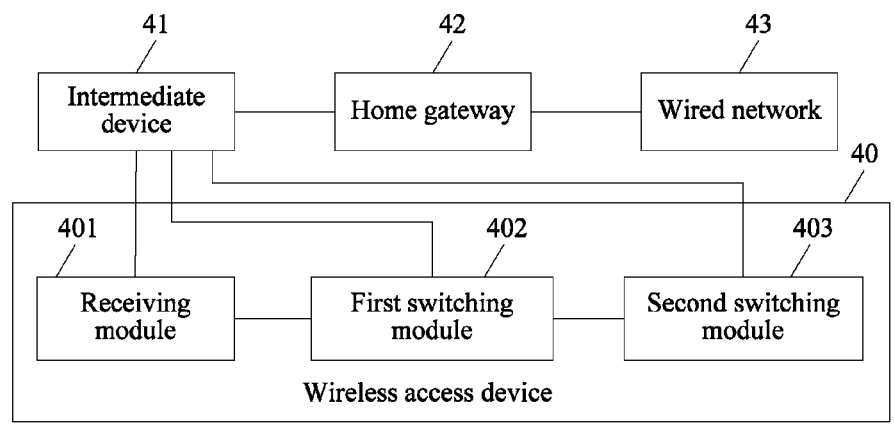
Figure 6:
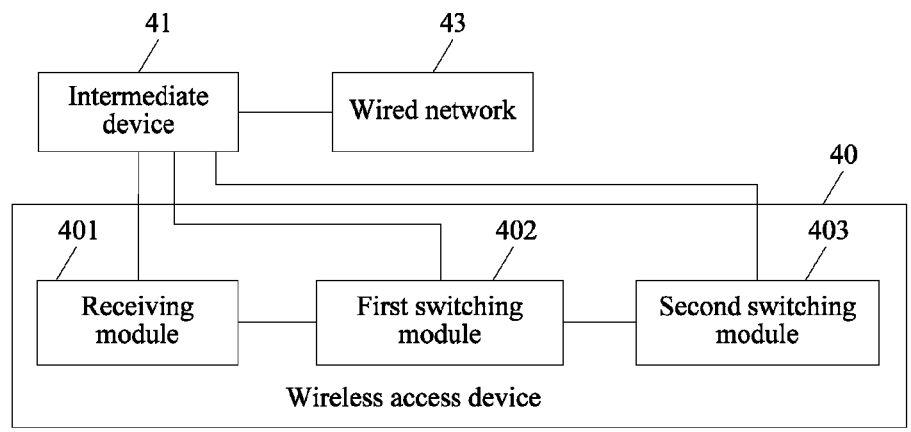

This embodiment provides a wireless access device, and as shown in FIG. 4, FIG. 5, and FIG. 6, the wireless access device 40 includes: a receiving module 401 configured to receive, after a connection is established between the wireless access device 40 and an intermediate device 41, an instruction message sent by the intermediate device 41, where the instruction message instructs the wireless access device 40 to switch from a currently connected wireless network to a wired network; a first switching module 402 configured to connect, according to the instruction message, the wired network through the intermediate device 41, and break the connection with the wireless network; and a second switching module 403 configured to switch from the wired network to the wireless network when a connection between the wireless access device 40 and the wired network is interrupted.

Furthermore, as shown in FIG. 5, the wireless access device 40 has a virtual port corresponding to the intermediate device 41.

The first switching module 402 is specifically configured to mount the virtual port as a WAN side interface to an IP layer, set output interfaces of current route configuration, a firewall, a DNS, and NAT as the virtual port, obtain a private network IP address from a home gateway 42, and according to the private network IP address, through the intermediate device 41 and the home gateway 42, access a wired network 43 which is connected to the home gateway 42.

The second switching module 403 is specifically configured to switch the virtual port from a WAN side to a LAN side, mount the virtual port under a network bridge, start its wireless interface as the WAN side interface, set output interfaces of the current route configuration, the firewall, the DNS, and the NAT as the wireless interface, and send to the home gateway 42 a request of releasing the private network IP address, so as to make the home gateway 42 release the private network IP address, and establish a connection with the wireless network.

Further, as shown in FIG. 6, the wireless access device 40 has a virtual port corresponding to the intermediate device 41.

The first switching module 402 is specifically configured to mount the virtual port as the WAN side interface to the IP layer, set output interfaces of the current route configuration, the firewall, the DNS, and the NAT as the virtual port, obtain the private network IP address from the intermediate device 41, and after a PPPOE dialing connection between the intermediate device 41 and the wired network 43 is established, access the wired network 43 through the intermediate device 41 according to the private network IP address.

The second switching module 403 is specifically configured to switch the virtual port from the WAN side to the LAN side, mount the virtual port under a network bridge, start its wireless interface as the WAN side interface, set output interfaces of the current route configuration, the firewall, the DNS, and the NAT as the wireless interface, and send to the intermediate device 41 a request of releasing the private network IP address, so as to make the intermediate device 41 release the private network IP address, and after the PPPOE dialing connection between the intermediate device 41 and the wired network 43 is broken, establish a connection with the wireless network.

It should be noted that, the wireless access device shown in FIG. 5 is applicable to the method described in Embodiment 2, and the wireless access device shown in FIG. 6 is applicable to the method described in Embodiment 3.

In the wireless access device provided in the embodiment of the present invention, after the connection between the wireless access device and the intermediate device is established, the wireless access device can be connected, according to the instruction of the intermediate device, to the wired network, and the connection with the wireless network is broken, and when the connection between the wireless access device and the wired network is broken, the wireless access device switches from the wired network to the wireless network. Compared with the prior art, the wireless access device can automatically switch between the wireless network and the wired network, and the user cannot only enjoy advantages of the wireless network but also enjoy advantages of the wired network, and furthermore, the quality of user experience can be improved. In addition, the intermediate device can charge the wireless access device and can improve the standby capability of the wireless access device.

Embodiment 5

Figure 7:
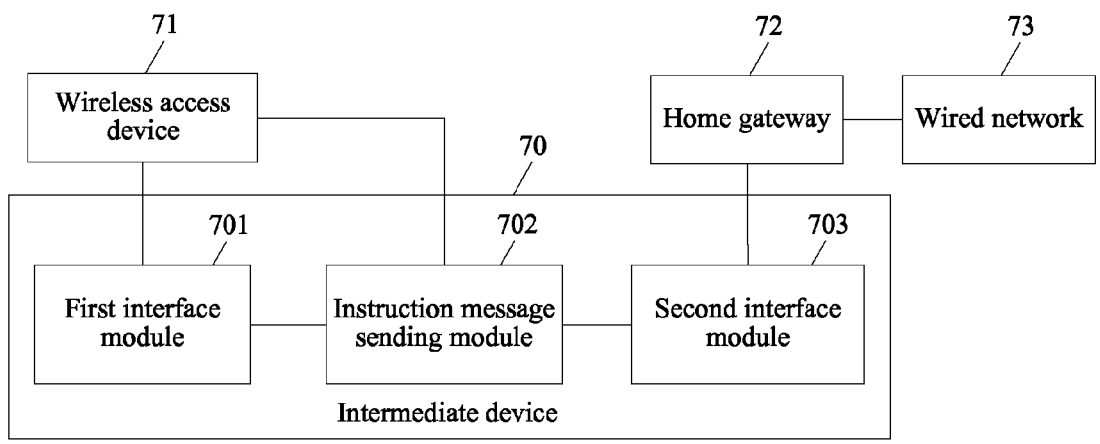
FIG. 7 and FIG. 8 are schematic structural diagrams of an intermediate device according to Embodiment 5 of the present invention.

This embodiment provides an intermediate device, and as shown in FIG. 7, the intermediate device 70 includes: a first interface module 701, where the intermediate device 70 establishes a connection with a wireless access device 71 through the first interface module 701; an instruction message sending module 702 configured to send, after the connection between the intermediate device 70 and the wireless access device 71 is established, an instruction message to the wireless access device 71 through the first interface module 701, and instruct the wireless access device 71 to switch from a currently connected wireless network to a wired network 73; and a second interface module 703, where the intermediate device 70 establishes a connection with a home gateway 72 through the second interface module 703, and the home gateway 72 is connected to the wired network 73.

It should be noted that the intermediate device in this embodiment is applicable to the method described in Embodiment 2.

In the intermediate device provided in the embodiment of the present invention, after the connection between the wireless access device and the intermediate device is established, the intermediate device can instruct the wireless access device to switch from the currently connected wireless network to the wired network, and through the intermediate device and the home gateway, the wireless access device can access the wired network. Compared with the prior art, the wireless access device can automatically switch between the wireless network and the wired network, and the user cannot only enjoy advantages of the wireless network but also enjoy advantages of the wired network, and furthermore, the quality of user experience can be improved. In addition, the intermediate device can charge the wireless access device and can improve the standby capability of the wireless access device.

Embodiment 6

Figure 8:
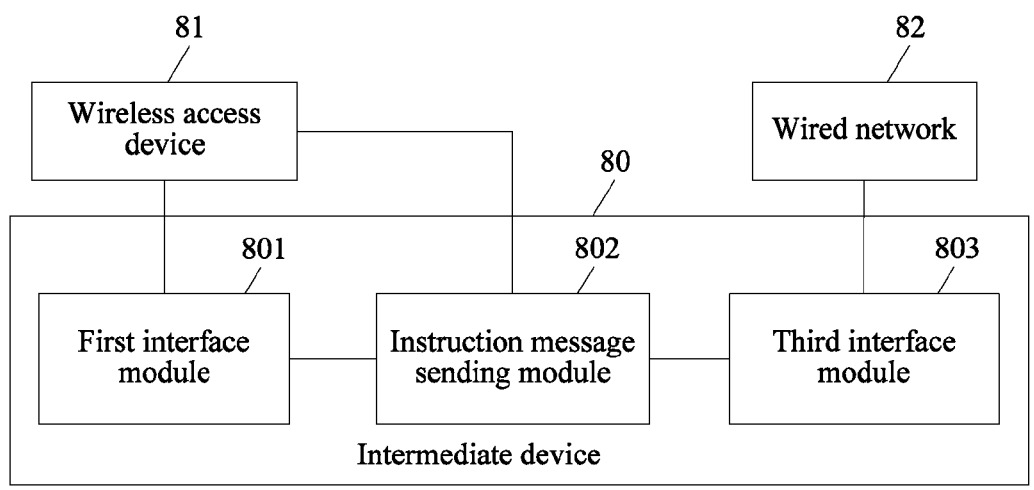

This embodiment provides an intermediate device, and as shown in FIG. 8, the intermediate device 80 includes: a first interface module 801, where the intermediate device 80 establishes a connection with a wireless access device 81 through the first interface module 801; an instruction message sending module 802 configured to send, after the connection between the intermediate device 80 and the wireless access device 81 is established, an instruction message to the wireless access device 81 through the first interface module 801, and instruct the wireless access device 81 to switch from a currently connected wireless network to a wired network 82; and a third interface module 803, where the intermediate device 80 establishes a connection with the wired network 82 through the third interface module 803.

It should be noted that the intermediate device in this embodiment is applicable to the method described in Embodiment 3.

In the intermediate device provided in the embodiment of the present invention, after the connection between the wireless access device and the intermediate device is established, the intermediate device can instruct the wireless access device to switch from the currently connected wireless network to the wired network, and through the intermediate device, the wireless access device can access the wired network. Compared with the prior art, the wireless access device can automatically switch between the wireless network and the wired network, and the user cannot only enjoy advantages of the wireless network but also enjoy advantages of the wired network, and furthermore, the quality of user experience can be improved. In addition, the intermediate device can charge the wireless access device and can improve the standby capability of the wireless access device.

Embodiment 7

An embodiment of the present invention further provides an apparatus for automatic switching between networks, and the apparatus includes the wireless access device shown in FIG. 5 and the intermediate device shown in FIG. 7. Reference may be made to the foregoing embodiments for structures of the wireless access device and the intermediate device, which are not repeatedly described here again.

Alternatively, the apparatus includes the wireless access device shown in FIG. 6 and the intermediate device shown in FIG. 8, and reference may be made to the foregoing embodiments for structures of the wireless access device and the intermediate device, which are not repeatedly described here again.

The apparatus for automatic switching between networks, the wireless access device, and the intermediate device provided in the embodiments of the present invention can implement the method embodiments provided in the foregoing. Reference may be made to the illustration in the method embodiments for the specific function implementation, which is not repeatedly described here again. The method and the apparatus for automatic switching between networks, the wireless access device, and the intermediate device provided in the embodiments of the present invention may be applicable to the automatic switching between the wireless network and the wired network, but are not merely limited to this.

Persons of ordinary skill in the art may understand that all or a part of the processes in the methods in the foregoing embodiments may be implemented by a computer program instructing relevant hardware. The program may be stored in a computer readable storage medium. When the program runs, the processes of the foregoing methods according to the embodiments are performed. The storage medium may be a magnetic disk, a compact disk, a Read-Only Memory (ROM), a Random Access Memory (RAM), and so on.

The foregoing descriptions are only specific implementation manners of the present invention, but the protection scope of the present invention is not limited to this. Any variation or replacement that can be easily thought of by those skilled in the art within the technical scope disclosed in the present invention shall fall within the protection scope of the present invention. Therefore, the protection scope of the present invention should be subject to the protection scope of the claims.

What is claimed is:

1. A method for automatic switching between networks comprising:
   receiving, by a wireless access device, an instruction message sent by an intermediate device after a connection between the wireless access device and the intermediate device is established, wherein the instruction message instructs the wireless access device to switch from a currently connected wireless network to a wired network;
   obtaining, by the wireless access device, a private network Internet Protocol (IP) address from a home gateway;
   accessing through the intermediate device and the home gateway, by the wireless access device, the wired network which is connected to the home gateway according to the private network IP address;
breaking a connection with the wireless network according to the instruction message; and
switching, by the wireless access device, from the wired network to the wireless network when the connection between the wireless access device and the wired network is broken.

2. The method according to claim 1, wherein switching the wireless access device from the wired network to the wireless network comprises:
sending, by the wireless access device, to the home gateway a request of releasing the private network IP address to make the home gateway release the private network IP address; and
establishing, by the wireless access device, the connection with the wireless network.

3. A wireless access device comprising:
a receiving module configured to receive an instruction message sent by an intermediate device after a connection between the wireless access device and the intermediate device is established, wherein the instruction message instructs the wireless access device to switch from a currently connected wireless network to a wired network;
a first switching module configured to connect the wired network through the intermediate device and break a connection with the wireless network according to the instruction message, obtain a private network Internet Protocol (IP) address from a home gateway, and access the wired network which is connected to the home gateway according to the private network IP address; and
a second switching module configured to switch from the wired network to the wireless network when the connection between the wireless access device and the wired network is interrupted.

4. The wireless access device according to claim 3, wherein the second switching module is configured to send to the home gateway a request of releasing the private network IP address to make the home gateway release the private network IP address and establish a connection with the wireless network.

5. An intermediate device comprising:
a first interface module that establishes a connection between the intermediate device and a wireless access device through the first interface module; and
an instruction message sending module configured to send an instruction message to the wireless access device through the first interface module and instruct the wireless access device to switch from a currently connected wireless network to a wired network after the connection between the intermediate device and the wireless device is established,
wherein the connection between the intermediate device and the wireless device is established by the wireless access device obtaining a private network Internet Protocol (IP) address from a home gateway, and the wireless access device accessing through the intermediate device and the home gateway the wired network which is connected to the home gateway according to the private network IP address.

6. The intermediate device according to claim 5, further comprising a second interface module, wherein the intermediate device establishes a connection with the home gateway through the second interface module, and wherein the home gateway is connected to the wired network.

7. The intermediate device according to claim 6, further comprising a third interface module, and wherein the intermediate device establishes the connection with the wired network through the third interface module.

8. The method according to claim 1, wherein switching from the wireless access device from the wired network to the wireless network comprises the wireless access device detecting that a Universal Serial Bus (USB) virtual port is not available.

9. The method according to claim 1, wherein switching from the wireless access device from the wired network to the wireless network comprises the wireless access device detecting that the intermediate device cannot be connected to the home gateway.

10. The method according to claim 1, wherein the intermediate device comprises a network bridge device.

11. The method according to claim 10, wherein the home gateway comprises an Asymmetric Digital Subscriber Line (ADSL).

12. The method according to claim 10, wherein the home gateway comprises a router.

13. The method according to claim 1, wherein the wireless access device comprises a dynamic host configuration protocol (DHCP) server, and wherein the wireless device allocates a private network IP address of a self-defined DHCP server IP address pool to a user equipment accessing the wireless access device.

14. The method according to claim 1, wherein the intermediate device is integrated with functions of the home gateway.

15. The method according to claim 14, wherein the intermediate device comprises a Universal Serial Bus (USB) composite device and communicates with the wireless access device through a USB interface.

16. The method according to claim 14, wherein the intermediate device comprises a network port and communicates with the wireless access device through the network port.

17. The method according to claim 14, wherein the intermediate device comprises a serial port and communicates with the wireless access device through the serial port.

18. The wireless access device according to claim 3, wherein the intermediate device comprises a network bridge device, wherein the wireless access device comprises a dynamic host configuration protocol (DHCP) server, and wherein the wireless access device allocates a private network IP address of a self-defined DHCP server IP address pool to a user equipment accessing the wireless access device.

19. The intermediate device according to claim 5, wherein the intermediate device comprises a network bridge device, wherein the wireless access device comprises a dynamic host configuration protocol (DHCP) server, and wherein the wireless access device allocates a private network IP address of a self-defined DHCP server IP address pool to a user equipment accessing the wireless access device.

* * * * *